United States Patent
Miura et al.

(10) Patent No.: US 10,253,148 B2
(45) Date of Patent: *Apr. 9, 2019

(54) METHOD AND DEVICE FOR MODIFYING RESIN

(71) Applicant: MEIDENSHA CORPORATION, Tokyo (JP)

(72) Inventors: Toshinori Miura, Yaizu (JP); Mitsuru Kekura, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/555,644

(22) PCT Filed: Mar. 11, 2016

(86) PCT No.: PCT/JP2016/057798
§ 371 (c)(1),
(2) Date: Sep. 5, 2017

(87) PCT Pub. No.: WO2016/143897
PCT Pub. Date: Sep. 15, 2016

(65) Prior Publication Data
US 2018/0044492 A1    Feb. 15, 2018

(30) Foreign Application Priority Data

Mar. 12, 2015 (JP) .................. 2015-048915

(51) Int. Cl.
*C08F 8/06* (2006.01)
*C08J 7/12* (2006.01)
*C01B 13/10* (2006.01)

(52) U.S. Cl.
CPC .............. *C08J 7/12* (2013.01); *C01B 13/10* (2013.01); *C08J 2379/08* (2013.01)

(58) Field of Classification Search
CPC ........................................................ C08F 8/06
(Continued)

(56) References Cited

U.S. PATENT DOCUMENTS 3,928,664 A   12/1975  Tarney et al.
5,069,926 A * 12/1991  Iwata ..................... B05D 3/147
                                                         427/337

(Continued)

FOREIGN PATENT DOCUMENTS

JP      03-195745 A    8/1991
JP      H04-283912 A   10/1992

(Continued)

OTHER PUBLICATIONS

Translation of JP 2013-207005 (2013) (Year: 2013).*
Translation of JP 2010-153773 (2010) (Year: 2010).*

*Primary Examiner* — Robert C Boyle
(74) *Attorney, Agent, or Firm* — Foley & Lardner LLP

(57) ABSTRACT

It is a method for modifying a resin (6), the method for hydrophilizing the surface of the resin (6). High-concentration ozone gas and an unsaturated hydrocarbon gas are supplied to the surface of the resin (6), and the surface of the resin (6) is hydrophilized. The high-concentration ozone gas is generated by re-vaporizing liquid ozone obtained by liquefaction and fractional distillation of an ozone-containing gas. Ozone gas having an ozone concentration of 50 vol % or greater is used as the high-concentration ozone gas. A gas containing an unsaturated hydrocarbon with a carbon number of 10 or lower which has a double bond or a triple bond is used as the unsaturated hydrocarbon gas.

7 Claims, 2 Drawing Sheets

(58) Field of Classification Search
USPC .......................................................... 525/388
See application file for complete search history.

(56) References Cited

U.S. PATENT DOCUMENTS

| | | | |
|---|---|---|---|
| 7,767,767 B2 | 8/2010 | Scheie et al. | |
| 8,187,389 B2 | 5/2012 | Miura | |
| 9,104,112 B2 | 8/2015 | Sakai et al. | |
| 2006/0088658 A1 | 4/2006 | Wu et al. | |
| 2006/0246573 A1 | 11/2006 | Kurane et al. | |
| 2010/0139708 A1 | 6/2010 | Miura | |
| 2010/0300482 A1* | 12/2010 | Miura | G03F 7/42 134/1.1 |
| 2015/0125665 A1 | 5/2015 | Nakase et al. | |

FOREIGN PATENT DOCUMENTS

| | | | |
|---|---|---|---|
| JP | H08-335576 A | | 12/1996 |
| JP | 2005-217232 A | | 8/2005 |
| JP | 2005-288257 A | | 10/2005 |
| JP | 2005-330329 A | | 12/2005 |
| JP | 2006-124631 A | | 5/2006 |
| JP | 2007-109984 A | | 4/2007 |
| JP | 2008-053562 A | | 3/2008 |
| JP | 2008-294168 A | | 12/2008 |
| JP | 2008-294170 A | | 12/2008 |
| JP | 2009-141028 A | | 6/2009 |
| JP | 2010-153773 A | | 7/2010 |
| JP | 2010153773 | * | 7/2010 |
| JP | 2012-197477 A | | 10/2012 |
| JP | 2012-246543 A | | 12/2012 |
| JP | 2013-207005 A | | 10/2013 |
| JP | 2013207005 | * | 10/2013 |
| JP | 2013-257593 A | | 12/2013 |
| WO | WO 2013/191052 A1 | | 12/2013 |
| WO | WO 2014/203892 A1 | | 12/2014 |

* cited by examiner (a) BEFORE TREATMENT  (b) AFTER TREATMENT

TREATED WITH ONLY HIGH-CONCENTRATION OZONE

METHOD AND DEVICE FOR MODIFYING RESIN

TECHNICAL FIELD

The present invention relates to a method and a device for modifying a resin, the method and the device for modifying the surface of the resin.

BACKGROUND TECHNOLOGY

A film made of a thermoplastic resin has excellent characteristics, and is used in many industries. As representative films, for example, a polyester film, an aramid-based film, an olefin-based film, a polypropylene film, a PPS (polyphenylene sulfide) film, and a PET (polyethylene terephthalate) film have been known. In addition, a film has been known which is made of a material such as PE (polyethylene), POM (polyoxymethylene or an acetal resin), PEEK (polyetheretherketone), an ABS resin (acrylonitrile, butadiene, a styrene copolymer synthetic resin), PA (polyamide), PFA (tetrafluoroethylene, a perfluoroalkoxyethylene copolymer), PI (polyimide) and PVD (polyvinyl dichloride).

In fields such as smartphones, tablet terminals, liquid crystal displays, solar light panels and automobiles, the application of a highly functionalized film has been expanded as a necessary component. A film is highly functionalized by technologies for not only high functionalization of a film material but also for high functionalization of a film layer structure (bulk control), multilayer lamination of a film and surface control of a film.

In the multilayer lamination of a film and the surface control of a film, for example, a surface modification of a film described in a Patent Document 1 is performed. In general, an object of the surface modification is to improve barrier properties, durability and wettability (adhesive properties), and the surface of the film having hydrophobicity (water repellency) is modified to the surface of the film having hydrophilicity. That is, the molecular structure of the surface of a film material is broken by some means, and by adding an OH group or an O group having hydrophilicity, the surface of the film is modified.

As a specific means for modifying the surface of the film, there are methods such as (1) physical modification methods such as corona discharge, plasma treatment and sputtering treatment, (2) a modification method by ultraviolet light irradiation or electron beam irradiation, (3) a modification method by reactive gases such as ozone, and (4) a wet modification method by chemical liquid or ozone water.

It is considered that the modification method of (2) by ultraviolet light irradiation or electron beam irradiation is not suitable as a method for modifying only the surface of the film, when the film having a property in which these ultraviolet light and the electron beam are transmitted easily is taken into consideration.

In addition, as to the modification method of (3) by the reactive gases, there is a possibility that a sufficient modification effect of the surface of the film cannot be obtained. For example, there is a possibility that oxygen radicals that are a reaction active species and which contribute to modification reaction cannot be sufficiently supplied to the surface of the film, even if ozone gas that is a representative reactive gas is used. The compulsive decomposition of the ozone gas is therefore performed by irradiating ultraviolet light to the ozone gas, to increase the supply amount of the oxygen radicals (see, for example, a Patent Document 2). However, the oxygen radicals generated by the ultraviolet light irradiation are oxygen radicals in an excited state, and reactivity is extremely high, and consequently, control is difficult. That is, in a case where ultraviolet light is irradiated to the ozone gas, the modification effect becomes high, as compared with a case where the surface modification is performed by only the ozone gas. However, it is difficult to supply the oxygen radicals to the surface of the film, and there is a possibility that a sufficient modification effect cannot be obtained.

In addition, as to the wet modification method of (4), there is a possibility that an application field is limited, because a step for drying the film is required after treatment, and a post-treatment and a treatment facility for the chemical liquid used for modification treatment are required.

Due to the above reasons, the physical modification methods of (1) having the highest modification effect have been the most widely used.

However, there is a possibility that fine modification control, such as the uniformity of the modification effect, by the corona discharge and the plasma treatment which are widely used as the physical modification methods of (1) becomes difficult, because electric discharge in the corona discharge and the plasma treatment occurs by dielectric breakdown of the gas between electrodes, and the modification effect is affected by the shape of the electrode and the state of the surface of the electrode. In addition, there is not a few possibility that the temperature of a film as a substrate becomes high by heat generation associated with the discharge, and the film is extremely damaged. Moreover, there a is possibility that a long-term fixed modification effect cannot be obtained because the surface of the electrode deteriorates with time by the discharge Moreover, in the physical modification methods of (1), there is a possibility that the modification effect is lost with the lapse of time. For example, in a film in which the contact angle of a water drop has been made small by hydrophilic treatment, it has been known that there is a case where the contact angle of the water drop returns to a state close to the state before the treatment in a few days. It is therefore difficult to storage the film for a long period of time, and there is also a case where the hydrophilic treatment is performed twice immediately after producing the film and before using the film to keep the hydrophilicity of the film.

PRIOR ART REFERENCES

Patent Documents

Patent Document 1: Japanese Patent Application Publication 2006-124631
Patent Document 2: Japanese Patent Application Publication 2012-246543
Patent Document 3: Japanese Patent Application Publication 2008-294170
Patent Document 4: Japanese Patent Application Publication 2013-207005
Patent Document 5: Japanese Patent Application Publication 2008-294168

SUMMARY OF THE INVENTION

An object of the present invention is to provide a surface treatment technique for a resin, which is capable of easily performing surface modification control.

According to one aspect of a method for modifying a resin in the present invention to achieve the above object, ozone gas and an unsaturated hydrogen gas are supplied to the resin for hydrophilizing the surface of the resin.

In addition, according to another aspect of the method for modifying the resin in the present invention, in the above method for modifying the resin, the ozone concentration of the ozone gas is 50 vol % or greater.

In addition, according to another aspect of the method for modifying the resin in the present invention, in the above method for modifying the resin, the unsaturated hydrocarbon gas is ethylene.

In addition, according to another aspect of the method for modifying the resin in the present invention, in the above method for modifying the resin, one gas of the ozone gas and the unsaturated hydrocarbon gas is supplied to flow parallel to the treatment surface of the resin, and the other gas of the ozone gas and the unsaturated hydrocarbon gas is supplied to flow in a direction toward the treatment surface of the resin.

In addition, according to another aspect of the method for modifying the resin in the present invention, in the above method for modifying the resin, the resin is moved so that the surface of the resin is uniformly hydrophilized, and the ozone gas and the unsaturated hydrocarbon gas are supplied to the resin.

In addition, according to another aspect of the method for modifying the resin in the present invention, in the above method for modifying the resin, a shower head is provided facing the surface of the resin, and the ozone gas and the unsaturated hydrocarbon gas are supplied from the shower head.

In addition, according to another aspect of the method for modifying the resin in the present invention, in the above method for modifying the resin, the resin is heated, and the ozone gas and the unsaturated hydrocarbon gas are supplied to the resin.

In addition, according to another aspect of the method for modifying the resin in the present invention, in the above method for modifying the resin, the temperature of the heating is a glass transition temperature of the resin or less.

In addition, according to another aspect of the method for modifying the resin in the present invention, in the above method for modifying the resin, supplying time of the ozone gas and the unsaturated hydrocarbon gas to the resin is one minute or less.

In addition, a modification device of the present invention to achieve the above object is a device for modifying the surface of the resin which has a treatment furnace storing the resin, an ozone supply device supplying the ozone gas to the treatment furnace and an unsaturated hydrocarbon supply device supplying an unsaturated hydrocarbon to the treatment furnace.

MODE FOR IMPLEMENTING THE INVENTION

Figure 1:
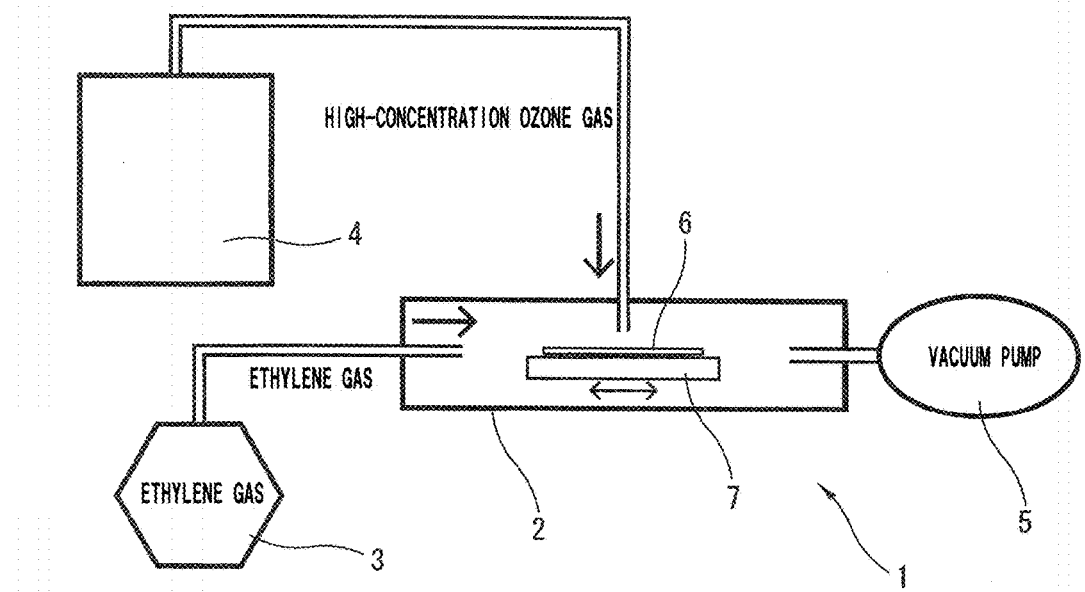
FIG. 1 is the schematic diagram of a modification device according to a first embodiment of the present invention.

A method and a device for modifying a resin, according to an embodiment of the present invention, will be explained in detail, with reference to the drawings.

The method for modifying the resin according to the embodiment of the present invention modifies the surface of the resin by supplying high-concentration ozone gas and an unsaturated hydrocarbon gas to the resin. In general, it has been known that ozone reacts with an unsaturated hydrocarbon, and it is decomposed into ketone and carboxylic acid through unstable intermediates such as ozonide.

A resin to be modified is a resin formed in a film shape or a solid shape. That is, as the resin to be modified, not only a thermoplastic resin but also a thermosetting resin are included. Specifically, a resin is used which is made by a polyester resin, an aramid-based resin, an olefin-based resin, a polypropylene resin, a PPS (polyphenylene sulfide) resin or a PET (polyethylene terephthalate) resin alone, as materials, or by combining them. In addition, a resin is modified which is made of materials such as PE (polyethylene), POM (polyoxymethylene or an acetal resin), PEEK (polyetheretherketone), an ABS resin (acrylonitrile, butadiene, a styrene copolymer synthetic resin), PA (polyamide), PFA (tetrafluoroethylene, a perfluoroalkoxyethylene copolymer), PI (polyimide), PVD (polyvinyl dichloride), PC (polycarbonate), PEN (1) (polyether nitrile), PEN (2) (polyethylene naphthalate).

The high-concentration ozone gas is an ozone gas having an ozone concentration of 20 vol % or greater, preferably 50 vol % or greater, further preferably 90 vol %. Ozone generated with general methods (for example, a silent discharge type) has an ozone concentration of 10 vol % or less. Only ozone is obtained by liquefaction and fractional distillation of an ozone-containing gas based on the difference of vapor pressure, following which it is re-vaporized again, and the high-concentration ozone is generated. As a device for generating the high-concentration ozone, for example, there is a pure ozone generator (MPOG-MP) made by MEIDENSHA CORPORATION. In addition, high-concentration ozone having an ozone concentration of 20 vol % or greater to 100 vol % or less can be supplied by MPOG-MP.

The unsaturated hydrocarbon gas is a gas containing an unsaturated hydrocarbon having, for example, a hydrocarbon (alkene) having a double bond, such as ethylene, and a hydrocarbon (alkyne) having a triple bond, such as acetylene. In addition, as the unsaturated hydrocarbon, one having a low molecular weight (for example, one having a carbon number of 10 or less) such as butylene is used.

As to the supply ratio of the high-concentration ozone gas to the unsaturated hydrocarbon gas, its optimum numerical value is different depending on a device mode. However, in the modification treatment of the resin, for example, the supply ratio by mole of the ozone to the unsaturated hydrocarbon is 1:1 to 4:1, more preferably 2:1 to 4:1.

Modification treatment time is, for example, one minute or less, more preferably three seconds to 20 seconds. If the treatment time is longer than one minute, there are cases where the resin (film) itself becomes cloudy and the surface of the resin is roughened. In addition, in cases where the resin does not become cloudy and the surface of the resin is not roughened even by performing the modification treatment, the modification treatment time may be one minute or longer.

Modification treatment temperature is preferably low temperatures. However, the resin may be heated in a range where the resin is not deformed and transformed, to improve an effect of the modification treatment. For example, the resin is heated at a glass transmission temperature or lower, and the modification treatment of the resin is performed.

Total pressure of the mixed gas of the high-concentration ozone gas and the unsaturated hydrocarbon gas is controlled in a range of a middle vacuum to a low vacuum of a few Pa to a few thousands of Pa, more preferably 50 Pa to 500 Pa, to prevent the control of reaction from becoming unavailable caused by the rapid decomposition reaction of unstable intermediates such as ozonido generated by the reaction between the high-concentration ozone and the unsaturated hydrocarbon, and generated in its process.

First Embodiment

FIG. 1 is a drawing schematically showing a device 1 according to a first embodiment of the present invention for modifying a resin. The modification device 1 according to the first embodiment has a chamber 2, an unsaturated hydrocarbon supply device 3, an ozone generating device 4 and a vacuum pump 5.

The chamber 2 stores a resin 6 to be modified. A sample stage 7 on which the resin 6 is mounted is provided in the chamber 2. In addition, the sample stage 7 is provided with a movable part (not shown in the drawings), and can be moved during the modification treatment so that the surface of the resin 6 is uniformly treated. Moreover, the sample stage 7 is provided with a heating mechanism (not shown in the drawings) which is capable of heating the resin 6. As the heating mechanism, for example, a thermocouple and an infrared heater are used.

The unsaturated hydrocarbon supply device 3 supplies the unsaturated hydrocarbon gas to the chamber 2. For example, the unsaturated hydrocarbon supply device 3 has a cylinder filled with the unsaturated hydrocarbon gas and a valve to supply and stop the filled unsaturated hydrocarbon gas.

The ozone generating device 4 generates the ozone gas which is supplied to the chamber 2. The ozone generating device 4 has a low-concentration ozone generating part generating low-concentration ozone by, for example, silent discharge and a high-concentration ozone generating part generating high-concentration ozone by liquefaction and fractional distillation of the low-concentration ozone.

The vacuum pump 5 is a pump to discharge a gas inside the chamber 2 outside, to reduce and adjust the pressure of the inside of the chamber 2. The vacuum pump 5 discharges the gas so that the pressure of the chamber 2 becomes a few thousands of Pa or lower (specifically, approximately 1000 Pa or lower) while the gases are supplied from the unsaturated hydrocarbon supply device 3 and the ozone generating device 4, and thereby it becomes possible to obtain a modification effect. The vacuum pump 5 is connected through a pipe to a side part of the chamber 2 which is opposite to a side part of the chamber 2 to which the unsaturated hydrocarbon device 3 is connected. In addition, as the vacuum pump 5, a pump having durability in ozone (for example, a dry pump) is used. Moreover, the gas discharge pipe to which the vacuum pump 5 is connected is provided with an ozone decomposing device (not shown in the drawings), because the gas discharged from the chamber 2 includes unreacted ozone.

Example

In this Example, as an example of the resin 6, the modification of an organic film (a polyimide film) was performed by gas reaction with no discharge. The polyimide film is a material used for a flexible wiring board. In the Example, 100 vol % of ethylene gas was supplied from the unsaturated hydrocarbon supply device 3, and 100 vol % of ozone was supplied from the ozone generating device 4.

First, the polyimide film was mounted on the sample stage 7, and by the vacuum pump 5, the inside of the chamber 2 was evacuated so that the pressure of the inside of the chamber 2 became a few Pa or lower.

Next, the high-concentration ozone gas was supplied from above the polyimide film, and the ethylene gas was supplied from the side of the chamber 2. The pressure ratio of the high-concentration ozone gas to the unsaturated hydrocarbon gas was 1:1, and treatment pressure (pressure inside the chamber 2) was 100 Pa. In addition, the gas inside the chamber 2 was discharged outside by the vacuum pump 5, and the modification treatment of the surface of the polyimide film was performed. That is, the high-concentration ozone gas was supplied in a direction toward the polyimide film treatment surface, and the ethylene gas was supplied so as to flow parallel to the polyimide film treatment surface, and the high-concentration ozone gas and the ethylene gas were mixed above the polyimide film, and then the high-concentration ozone gas and the ethylene gas were reacted above the polyimide film.

At this time, the sample stage 7 was moved so that the whole surface of the polyimide film was modified by the mixed gas of the high-concentration ozone gas and the ethylene gas, while supplying the high-concentration ozone gas (and the ethylene gas). For example, the sample stage 7 was moved in a horizontal direction to the treatment surface of the polyimide film.

Figure 2:
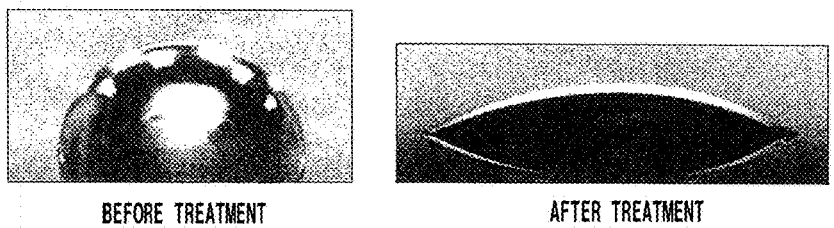
FIG. 2 (a) is a drawing showing a result of an evaluation of the contact angle of a water drop in a resin surface before modification treatment, and FIG. 2 (b) is a drawing showing a result of an evaluation of the contact angle of a water drop in the resin surface after the modification treatment.

The wettability of the surface of the polyimide film after the modification treatment was evaluated by the contact angle of a water drop. The result of the evaluation is shown in FIG. 2. As is clear from FIG. 2, as compared with the polyimide film before the modification treatment (shown in FIG. 2 (a)), in the polyimide film after the modification treatment (shown in FIG. 2 (b)), it was confirmed that the contact angle became remarkably small, and by the modification treatment, the surface of the polyimide film was hydrophilized.

Figure 3:
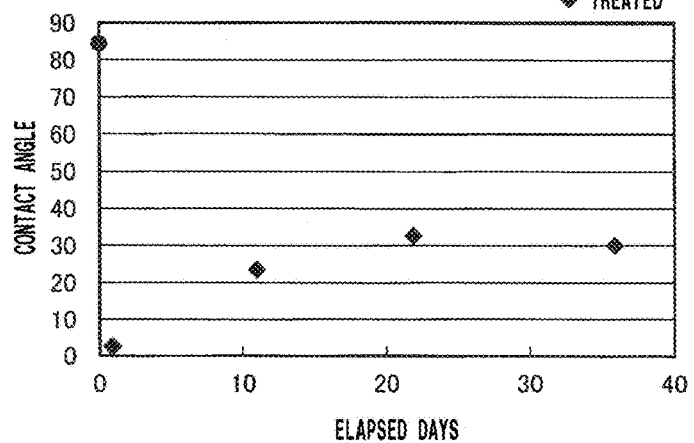
FIG. 3 is a drawing showing a change with time in the contact angle.

In addition, as shown in FIG. 3, the contact angle of the water drop becomes almost zero degree immediately after the treatment. However, after that, the contact angle of the water drop tends to become large with the laps of time. It was, however, confirmed that even after passing one month or longer from the treatment, the contact angle of the water drop was maintained a half or less of the contact angle before the treatment.

According to the method and the device 1 for modifying the resin 6 according to the first embodiment of the present invention, as described above, as compared with a physical modification methods such as corona discharge and plasma treatment, it is possible to remarkably improve the wettability of the surface of the resin 6. Specifically, the contact angle of the water drop on the surface of the resin 6 can be remarkably small. Moreover, according to the method and the device 1 for modifying the resin 6 according to the first embodiment of the present invention, it is possible to perform the surface modification treatment which has a small loss in the effect of the wettability after the modification treatment.

That is, by supplying the high-concentration ozone gas and the unsaturated hydrocarbon to the surface of the resin 6, it becomes possible to generate the reaction gas of the ozone and the unsaturated hydrocarbon in the vicinity of the surface of the resin 6, and the surface of the resin 6 can be modified. In particular, by setting the ozone concentration of the high-concentration ozone gas to 50 vol % or greater, the reaction gas of the ozone and the unsaturated hydrocarbon can be sufficiently generated above the surface of the resin 6, and thereby the modification of the resin 6 can be surely performed.

Figure 4:
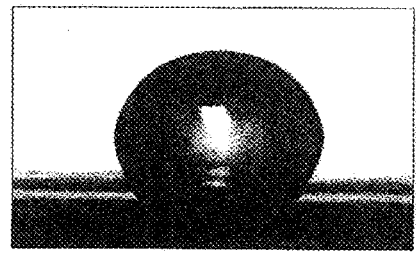
FIG. 4 is a drawing showing a result of an evaluation of the contact angle of a water drop in a resin surface after treatment by high-concentration ozone.

For example, as shown in FIG. 4, in a case where only the high-concentration ozone is supplied to the resin 6, a sufficient surface modification effect (for example, an effect of wettability improvement) cannot be obtained. In contrast to this, according to the method for modifying the resin 6 according to the first embodiment of the present invention, as shown in FIG. 2 (*b*), by supplying the high-concentration ozone gas and the unsaturated hydrocarbon gas to the surface of the resin 6, an excellent surface modification effect can be obtained.

In addition, by treating the surface of the resin 6 with the high-concentration ozone gas and the unsaturated hydrocarbon gas, the modification treatment of the surface of the resin 6 can be more uniformly performed.

In addition, by setting the modification time of the resin 6 to one minute or less, the surface of the resin 6 can be modified while suppressing the occurrence of the roughness on the surface of the resin 6. For example, there is a case where the mixed gas of high-concentration ozone gas and an unsaturated hydrocarbon gas is used to remove resist (for example, patent documents 4 and 5). However, an object of this treatment is to remove an organic matter from a treatment object. It is therefore considered that this treatment is unsuitable for the surface modification of the resin 6. That is, in a case where a material of the resin 6 is removed from the surface of the resin 6, there is a possibility that the surface of the resin 6 becomes rough. In contrast to this, since an object of the method for modifying the resin 6, according to the embodiment of the present invention, is to modify the surface of the resin 6, the modification treatment of the resin 6 is performed on a condition (time or temperature) in which the surface of the resin 6 does not become rough and the resin 6 is not deformed and transformed. As that result, the surface modification reaction of the resin 6 based on the reaction of the high-concentration ozone and the unsaturated hydrocarbon can be stopped at a reaction on a step in which the molecular structure of the surface of the film is broken, and an O group and an OH group are added thereto.

Second Embodiment

Figure 5:
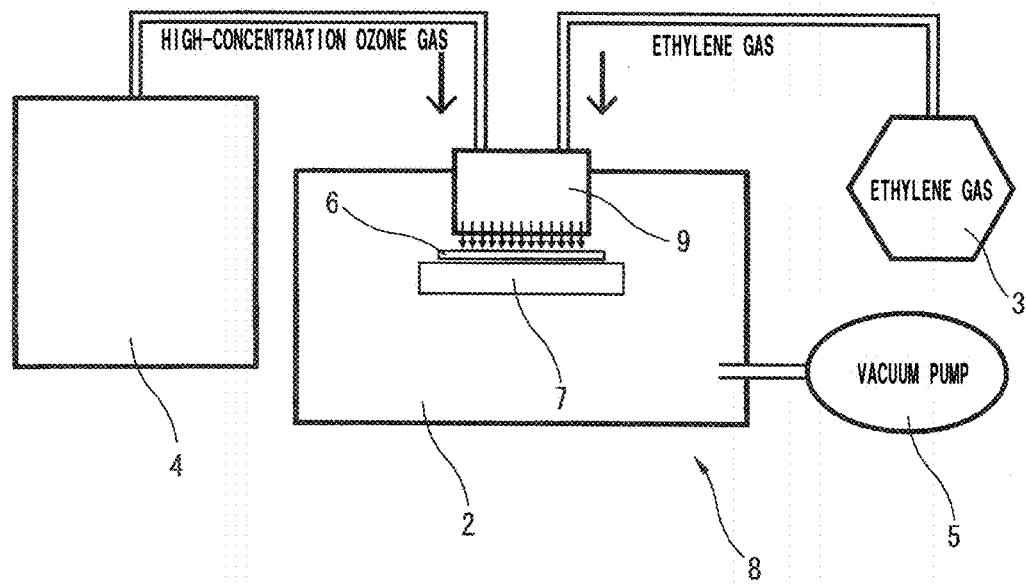
FIG. 5 is a drawing schematically showing a modification device according to a second embodiment of the present invention.

FIG. 5 is a drawing schematically showing a modification device 8 for the resin 6, according to a second embodiment of the present invention. The modification device 8 according to the second embodiment has a structure in which a shower head 9 facing the surface of the resin 6 is provided, and this structure is different from that of the modification device 1 according to the first embodiment. In the structure of the modification device 8, the same structure as that of the modification device 1 according to the first embodiment has the same signs, and the structure of the modification device 8 which is different from that of the modification device 1 will be explained in detail.

As shown in FIG. 5, the modification device 8 according to the second embodiment of the present invention has a chamber 2, an unsaturated hydrocarbon supply device 3, an ozone generating device 4 and a vacuum pump 5.

The chamber 2 stores the resin 6 to be modified. A sample stage 7 on which the resin 6 is mounted is provided in the chamber 2. In addition, the sample stage 7 is provided with a heat mechanism (not shown in the drawings) which is capable of heating the resin 6. Moreover, the shower head 9 is provided facing the treatment surface of the resin 6 (that is, the surface of the sample stage 7 on which a sample is mounted), so as to be able to supply the high-concentration ozone gas and the unsaturated hydrocarbon gas to the surface of the resin 6 mounted on the sample stage 7.

Figure 6:
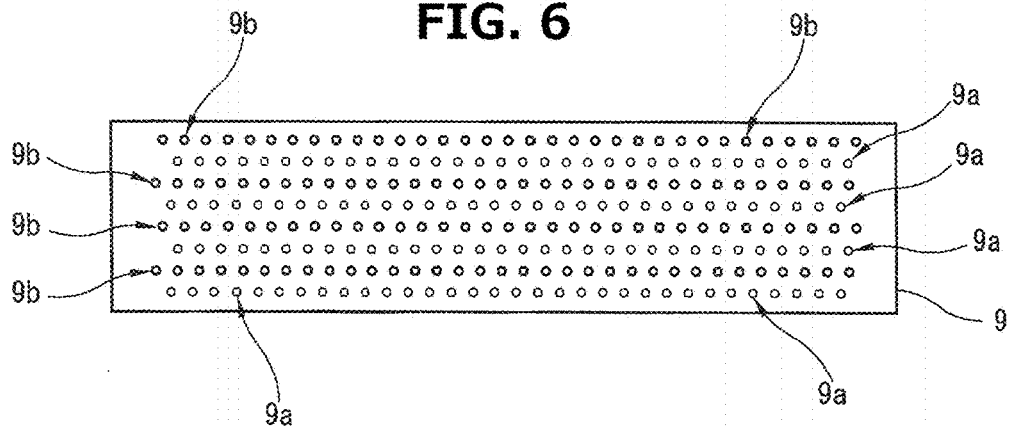
FIG. 6 is a drawing showing an example of an arrangement of injection holes of a shower head.

The shower head 9 is provided in the chamber 2, and supplies the high-concentration ozone gas and the unsaturated hydrocarbon gas to the surface of the resin 6. That is, the unsaturated hydrocarbon supply device 3 and the ozone generating device 4 are connected to the shower head 9 through pipes. In addition, as shown in FIG. 6, injection holes 9*a* through which the unsaturated hydrocarbon gas is injected and injection holes 9*b* through which the high-concentration ozone gas is injected are formed on the surface of the shower head 9 which faces the surface of the resin 6, so that the high-concentration ozone gas and the unsaturated hydrocarbon gas are supplied to the surface of the resin 6. The shower head 9 is provided apart from the surface of the resin 6 by a distance which does not interfere the uniformity of a gas flow (that is, the uniformity of the modification treatment of the surface) by the shower head 9. For example, the shower head 9 is provided in the chamber 2 so that the distance between the shower head 9 and the resin 6 (the sample stage 7) becomes 5 mm.

The modification of the surface of the resin 6 by the modification device 8 was performed by evacuating the inside of the chamber 2 so that the pressure of the inside of the chamber 2 became a few Pa or lower by the vacuum pump 5, and supplying the high-concentration ozone gas and the unsaturated hydrocarbon gas to the resin 6 mounted on the sample stage 7. That is, the high-concentration ozone gas and the unsaturated hydrocarbon gas were supplied from the shower head 9 facing the surface of the resin 6, and the two gases were mixed in the vicinity of the surface of the resin 6, and the modification of the surface of the resin 6 was performed. In addition, 100 vol % of ethylene gas was supplied from the unsaturated hydrocarbon supply device 3 and 100 vol % of ozone was supplied from the ozone generating device 4, and the modification of the surface of the resin 6 was performed. The pressure ratio of the high-concentration ozone gas to the unsaturated hydrocarbon gas was 3:1, and treatment pressure (the pressure of the chamber 2) was 100 Pa.

As the above, according to the modification device 8 according to the second embodiment of the present invention, similar to the modification device 1 according to the first embodiment, the contact angle of a water drop on the surface of the resin 6 became remarkably small, and a loss in the wettability effect of the surface of the resin 6 after the modification treatment was also small.

In addition, in the modification device 8, by supplying the high-concentration ozone gas and the unsaturated hydrocarbon gas from the shower head 9, it is possible to enlarge a treatment area of the surface of the resin 6. As a result, the treatment time can be shortened. Moreover, a movable part provided to the sample stage 7 can be omitted, because it is possible to treat a large area of the surface of the resin 6 without moving the sample stage 7. That is, periodic replacement of a seal portion, etc. is necessary because the movable part of the sample stage 7 is exposed to ozone gas having high reactivity. However, by omitting the movable part, this work can be reduced.

As the above, although the method and the device for modifying the resin in the present invention have been explained in detail with reference to the specific embodiments, the method and the device for modifying the resin in the present invention are not limited to the embodiments, and can be properly changed in a design in a scope not impairing the characteristics of the invention, and a mode changed in a design is also included in a technical scope of the present invention.

For example, in the modification device 1 according to the first embodiment, the high-concentration ozone gas is supplied from above the resin 6 and the unsaturated hydrocarbon gas is supplied in the direction parallel to the treatment surface of the resin 6. However, the unsaturated hydrocarbon gas may be supplied from above the resin 6 and the high-concentration ozone gas may be supplied in the direction parallel to the treatment surface of the resin 6.

In addition, the injection holes 9a and 9b of the shower head 9 are not limited to the mode of FIG. 6. For example, the high-concentration ozone gas and the unsaturated hydrocarbon gas are mixed immediately before being supplied to an object such as a resin, and the mixed gas is supplied to the resin 6 from the shower head 9.

In addition, the modification method and the modification device of the present invention may be used for hydrophilizing a glass, etc.

The invention claimed is:

1. A method for modifying a resin, comprising:
supplying ozone gas and an unsaturated hydrocarbon gas to the resin for hydrophilizing a surface of the resin,
wherein the surface of the resin is hydrophilized with a reaction gas of the ozone gas and the unsaturated hydrocarbon gas,
wherein an ozone concentration of the ozone gas is 50 vol % or greater, and
wherein a modification time by the ozone gas and the unsaturated hydrocarbon gas is one minute or less.

2. The method for modifying the resin according to claim 1, wherein the unsaturated hydrocarbon gas comprises ethylene.

3. The method for modifying the resin according to claim 1, wherein one gas of the ozone gas and the unsaturated hydrocarbon gas is supplied to flow parallel to a treatment surface of the resin, and
wherein another gas of the ozone gas and the unsaturated hydrocarbon gas is supplied to flow in a direction toward the surface of the resin.

4. The method for modifying the resin according to claim 1, wherein the resin is moved such that the surface of the resin is uniformly hydrophilized, and the ozone gas and the unsaturated hydrocarbon gas are supplied to the resin.

5. The method for modifying the resin according to claim 1, further comprising providing a shower head facing the surface of the resin, and
wherein the ozone gas and the unsaturated hydrocarbon gas are supplied from the shower head.

6. The method for modifying the resin according to claim 1, wherein the resin is heated, and the ozone gas and the unsaturated hydrocarbon gas are supplied to the resin.

7. The method for modifying the resin according to claim 6, wherein a temperature to which the resin is heated is less than or equal to a glass transition temperature of the resin.

* * * * *